(12) United States Patent
Ridgeway et al.

(10) Patent No.: US 8,876,094 B1
(45) Date of Patent: Nov. 4, 2014

(54) MULTI-AXIS ENERGY ATTENUATING MOUNT

(75) Inventors: Aubrey Donald Ridgeway, Queen Creek, AZ (US); Richard F. Langner, Scottsdale, AZ (US); William J. Perciballi, Phoenix, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 132 days.

(21) Appl. No.: 13/567,946

(22) Filed: Aug. 6, 2012

Related U.S. Application Data

(60) Provisional application No. 61/515,812, filed on Aug. 5, 2011.

(51) Int. Cl.
    *F16F 1/34* (2006.01)
(52) U.S. Cl.
    USPC ........................................... 267/161; 267/160
(58) Field of Classification Search
    USPC .......... 188/371–374; 267/158–163, 131, 133; 297/216.16, 216.17
    See application file for complete search history.

(56) References Cited

U.S. PATENT DOCUMENTS

| | | | |
|---|---|---|---|
| 3,344,397 A * | 9/1967 | Elliott et al. | 267/161 |
| 3,586,131 A | 6/1971 | Le Mire | |
| 3,598,389 A * | 8/1971 | Kohler | 267/161 |
| 3,612,223 A | 10/1971 | Shiomi | |
| 3,705,740 A | 12/1972 | Shiomi | |
| 4,060,278 A | 11/1977 | Maeyerspeer | |
| 4,116,087 A | 9/1978 | Zeller | |
| 4,272,114 A | 6/1981 | Hirano | |
| 4,791,243 A | 12/1988 | Ibanez | |
| 5,361,243 A * | 11/1994 | Kasahara | 267/161 |
| 6,017,084 A | 1/2000 | Carroll, III | |
| 6,561,580 B1 | 5/2003 | Bergey | |
| 7,270,319 B2 * | 9/2007 | Culpepper | 267/160 |

* cited by examiner

*Primary Examiner* — Melanie Torres Williams
(74) *Attorney, Agent, or Firm* — James L Farmer

(57) ABSTRACT

Methods and apparatus are provided for a mounting system adapted to attenuate a shock load imparted by a structure to an object being supported by the structure. In one exemplary embodiment the mounting system comprises a mounting plate with a perimeter portion, a central boss, and an array of at least two symmetrically arranged perforations extending through the mounting plate between the perimeter portion and the central boss. The perforations are arranged so as to cooperatively define at least two deformable links that interconnect the central boss with the perimeter portion of the mounting plate, wherein the deformable links are adapted to attenuate the shock load through plastic deformation.

16 Claims, 18 Drawing Sheets

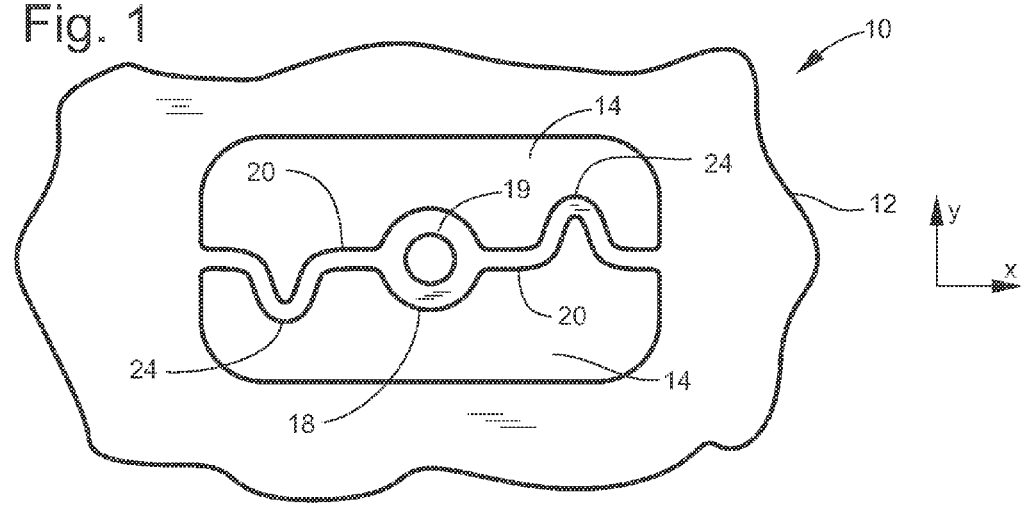
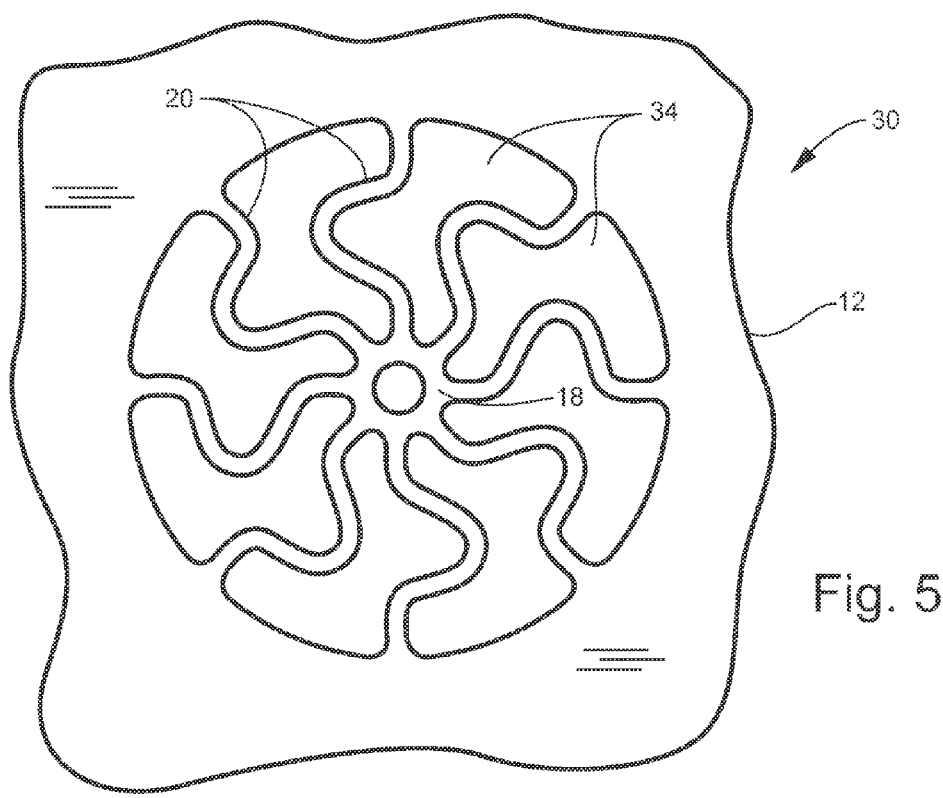

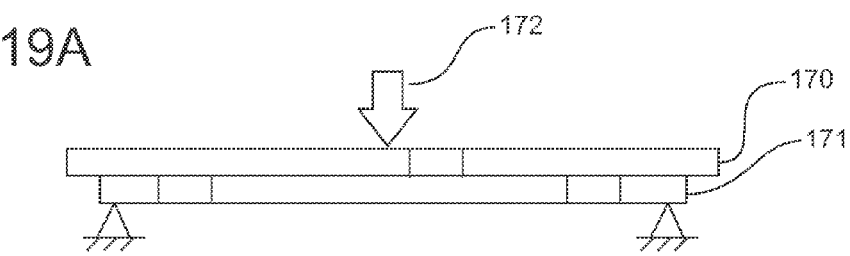
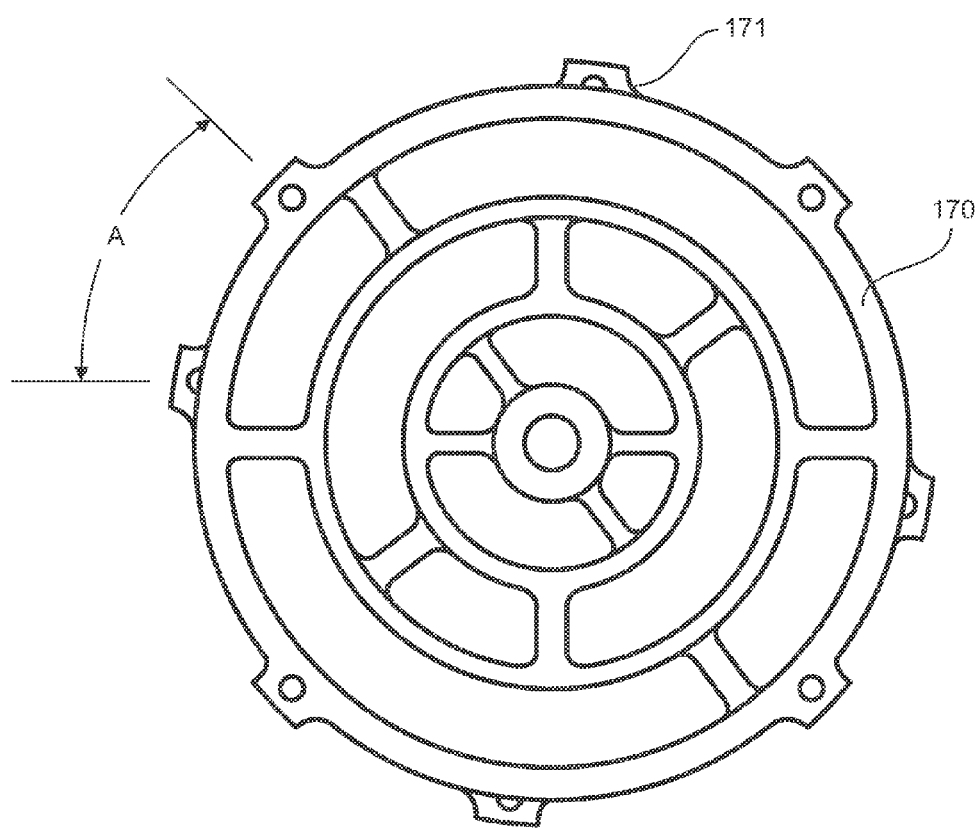

US 8,876,094 B1

MULTI-AXIS ENERGY ATTENUATING MOUNT

TECHNICAL FIELD

The technical field of the present disclosure encompasses devices and systems adapted to absorb mechanical energy by plastic deformation, including for example, energy attenuating systems for seats used in military vehicles and aircraft.

BRIEF DESCRIPTION OF THE DRAWINGS

In the accompanying drawings:

FIG. 1 is a plan view of a multi-axis energy attenuating (EA) mount comprising two deformable links extending from a central mounting boss;

FIG. 5 is a plan view of a multi-axis EA mount comprising a plurality of evenly spaced deformable links;

FIGS. 19A and 19B are front and side views respectively of a stacked embodiment of the multi-axis EA mount comprising two offset plates;

DESCRIPTION OF THE EMBODIMENTS

Figure 2:
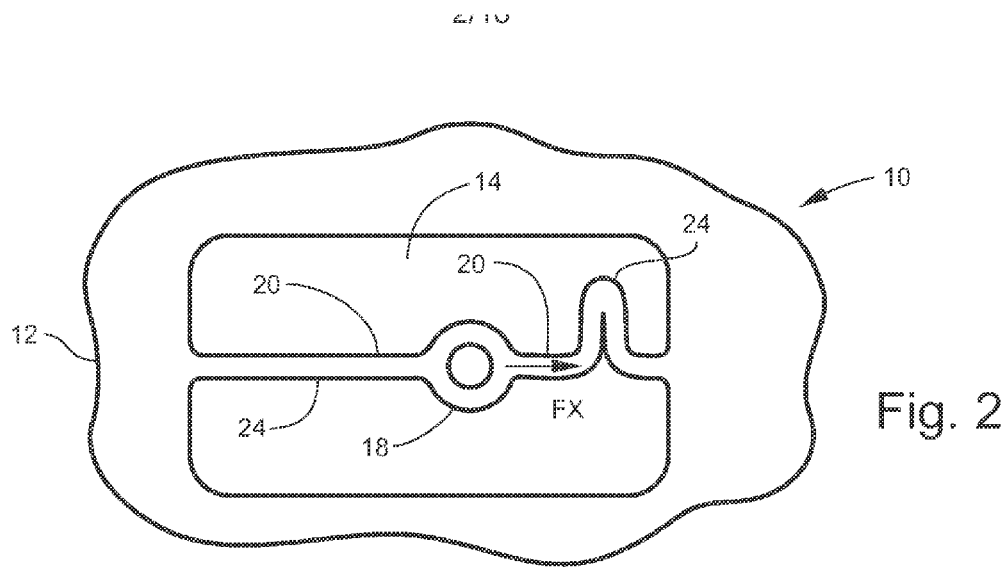
FIG. 2 is another plan view of the EA mount of FIG. 1 illustrating deformation resulting from a force applied in the "X" direction.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom. The term "vehicle" as used herein is intended to mean any person carrying structure, including but not limited to all types of land vehicles, aircraft, watercraft, rockets, spacecraft, and the like. As used herein, the term "aircraft" is intended to denote any airborne vehicle including but not limited to airplanes, jets, gliders, helicopters, and lighter-than-air craft.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

For convenience, the following conventions will be used herein to describe orientations and directions. Referring to the Cartesian coordinate axes denoted on the drawing Figures, words such as "up", "upward", or "top" refer to the positive Z direction; words such as "down", "downward", or "bottom" refer to the negative Z direction; "right" refers to the positive X direction; and "left" refers to the negative X direction. Other orientation or direction related words used herein but not listed above should be given their customary meaning not inconsistent with these conventions. Further, the association of words to particular coordinate axes is intended to provide general directions and orientations, and unless otherwise noted is not necessarily intended to require precise alignment with any coordinate direction.

Energy attenuating ("EA") devices, or links, are typically employed to mitigate transmission of severe shock loads during events involving high instantaneous relative acceleration between a structure and a person or object supported by the structure. For example, EA devices are commonly used in automobiles in areas such as the steering column, bumper, and other crush zones. Special seats used in military vehicles also incorporate EA mounts for isolating seated occupants against the shock loads produced by under vehicle mine blasts, crashes, and rollovers. Similar shock absorbing seats are used in military aircraft and helicopter seats to absorb the energy of a so-called "slam down" event. Such EA systems are generally designed to stroke in the direction of the anticipated shock load, such as toward the floor of a vehicle or aircraft, while absorbing the imparted energy.

EA devices used in such applications are typically in the form of a single use deformable member disposed between the protected object and supporting structure. In seat applications for example, the EA device is rigid and strong enough to support the weight and G-loads of an occupied seat under non-extreme accelerations without significant deformation, while having the ability to deform in a controlled, predictable manner under severe loading conditions. EA devices can be crushable, expandable, or tear-able; and take forms such as curved or bent elongated bars, crush tubes, inverting tubes, rip stitch webs, and the like.

Referring now specifically to the drawings, a multi-axis EA mount according to one exemplary embodiment of the present disclosure is illustrated in FIG. 1, and shown generally at reference numeral 10. The EA mount 10 comprises a solid plate 12 with cutout portions 14 that cooperate to define a central mounting boss 18 supported by left and right deformable links 20. The mounting boss 18 may include an attachment feature, such as hole 19, for use in attaching the plate 12 to another structure or object. The cutout portions 14 are further shaped to cooperatively define kinked sections 24 in the deformable links 20. The plate 12, along with mounting boss 18 and deformable links 20 may be made of various ductile or non-brittle metals, such as structural steel, aluminum, titanium, and fabricated using any suitable technique, such as casting, forging, punching, sawing, water jet cutting, and the like. Additionally, a multi-axis EA mount in accordance with the present disclosure may include various environmental sealing treatments for corrosion and wear protection. Such treatments may for example be in the form of a coating, such as a paint or anodize, or alternatively, a thicker material such as a viscous polymer or epoxy that partially or completely fills the perforations.

The exemplary EA mount of FIG. 1 is intended to absorb the energy of a shock load imparted to the mounting boss 18 in directions that are in or out of the plane of plate 12. FIG. 2 depicts the EA mount 10 of FIG. 1 after application of an in-plane shock load to mounting boss 18 in a direction aligned with deformable links 20. The EA mount 10 absorbs such a load through plastic deformation of the deformable links 20 as mounting boss 18 is forced in the direction of the arrow FX relative to the rest of plate 12. In particular, the right deformable link 20 (when facing FIG. 2) experiences a compression load tending to collapse the right kinked section 24, while tension in the left deformable link 20 expands the left kinked section 24. FIG. 2 shows the mounting boss 18 translated in the direction of load FX such that the right kinked portion 24 has fully collapsed, and the left kinked portion 24 has completely straightened out.

Figure 3:
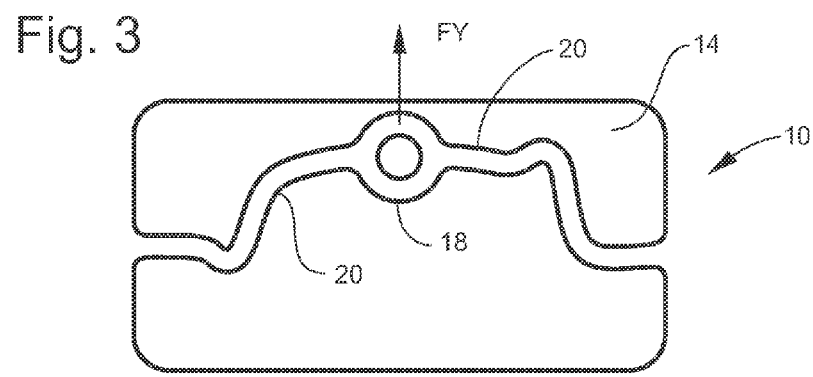
FIG. 3 is another plan view of the EA mount of FIG. 1 illustrating deformation resulting from a force applied in the "Y" direction.

The exemplary EA mount 10 may also be capable of absorbing in-plane loads applied in directions that are not in alignment with deformable links 20, such as a load in the direction indicated by arrow FY in FIG. 3. As would be expected for such non-aligned loading events, the amount and rate of energy absorption may vary with the degree of misalignment with the deformable links 20. Regardless as to exact load direction, translation of the mounting boss 18 subjected to an in-plane shock load nevertheless absorbs energy through deformation of links 20. Accordingly one skilled in the art will recognize that for a particular application and shock load, various design parameters, such as the material thickness and shape of the cutouts may be selected to absorb the imparted energy over a desired stroking distance without bottoming out or overloading the deformable links. FIG. 3 illustrates just such a deformed condition in which the mounting boss 18 has translated in the direction of shock load FY to a position just short of bottoming out against the side of cutout 14.

Figure 4:
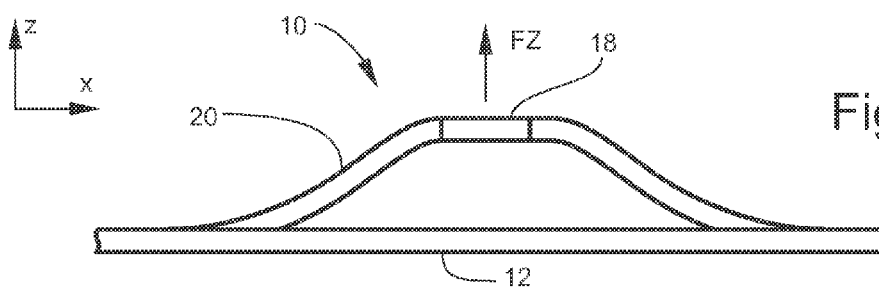
FIG. 4 is side view of the EA mount of FIG. 1 illustrating deformation resulting from a force applied in the "Z" direction.

The EA mount 10 is also capable of absorbing out of plane shock loads. FIG. 4 shows the EA mount 10 and plate 12 of the FIG. 1 in a deformed condition as may result from application of a sufficiently large out of plane shock load FZ. In this case, both of the deformable links 20 have stretched, allowing the EA mount to deflect substantially out of plane with plate 12 to absorb the energy of the imparted shock load.

The EA mount 10 is thus capable of deflecting and absorbing energy in three dimensions. Moreover, the three types of deformation shown in FIGS. 2-4 may occur simultaneously when the EA mount 10 is subjected to a shock load that is not in the unlikely direction of being in precise alignment with one of the three coordinate directions. In this regard, knowledge of the anticipated directions and magnitudes of anticipated shock loads may be advantageously accounted for in selection of the particular dimensions, shapes, and material properties of the EA mount.

Another embodiment of a multi-axis EA mount in accordance with the present disclosure is illustrated in FIG. 5, and shown generally at reference numeral 30. Like EA mount 10, the EA mount 30 is formed in a solid plate 12 via an array of cutout portions 34 distributed about a central mounting boss 18. The cutout portions 34 are shaped to cooperatively define a corresponding array of deformable links 20 between each pair of cutouts. Unlike EA mount 10 however, cutout portions 34 and deformable links 20 in EA mount 30 are arranged in a circumferentially symmetrical manner around central mounting boss 18. Although more complex, the symmetrical geometry of EA mount 30 naturally results in a more symmetrical response to in-plane shock loads in particular, than may be achievable with a non-symmetrical embodiment such as that of FIG. 1.

Figure 6:
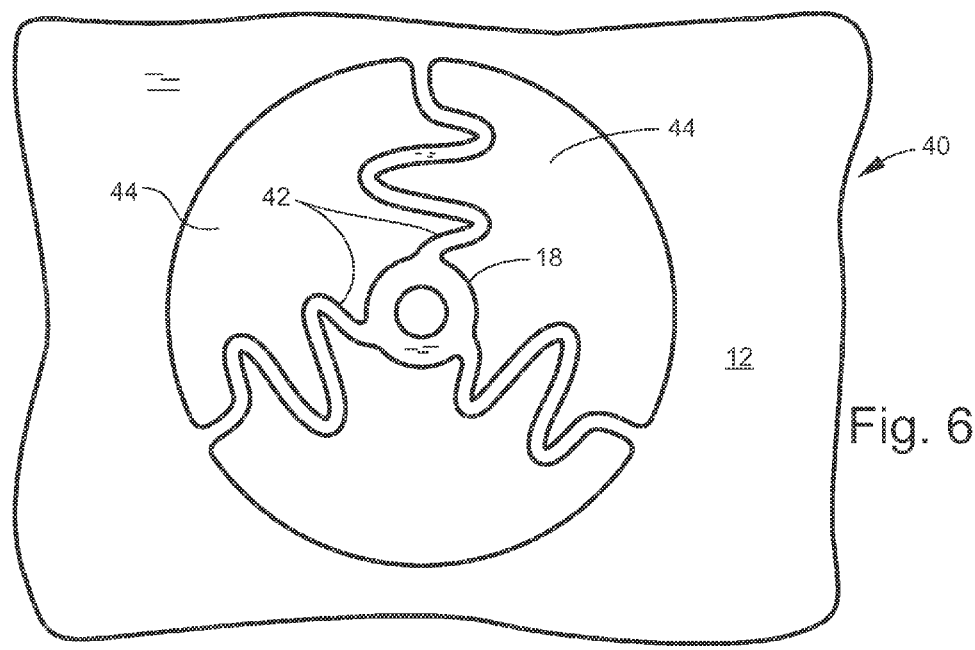
FIG. 6 is a plan view of a multi-axis EA mount comprising deformable links with multiple bends.

FIG. 6 illustrates another embodiment of a symmetrically designed multi-axis, three dimensionally deformable EA mount, indicated generally at reference numeral 40. A central mounting boss 18 is supported by an array of evenly distributed deformable links 42 disposed between cutout portions 44 in a solid plate 12. Instead of a single kinked section in each deformable link as in the previously described embodiments, the deformable links 42 each comprise multiple kinked, or bent sections in a generally sinusoidal pattern. The sinusoidal pattern may extend substantially over the entire span of the deformable link as illustrated, and may include more or less kinks, or bends than shown. In addition, the size and shape of the individual kinks forming the pattern may vary with radial distance from the central mounting boss 18.

Figure 7:
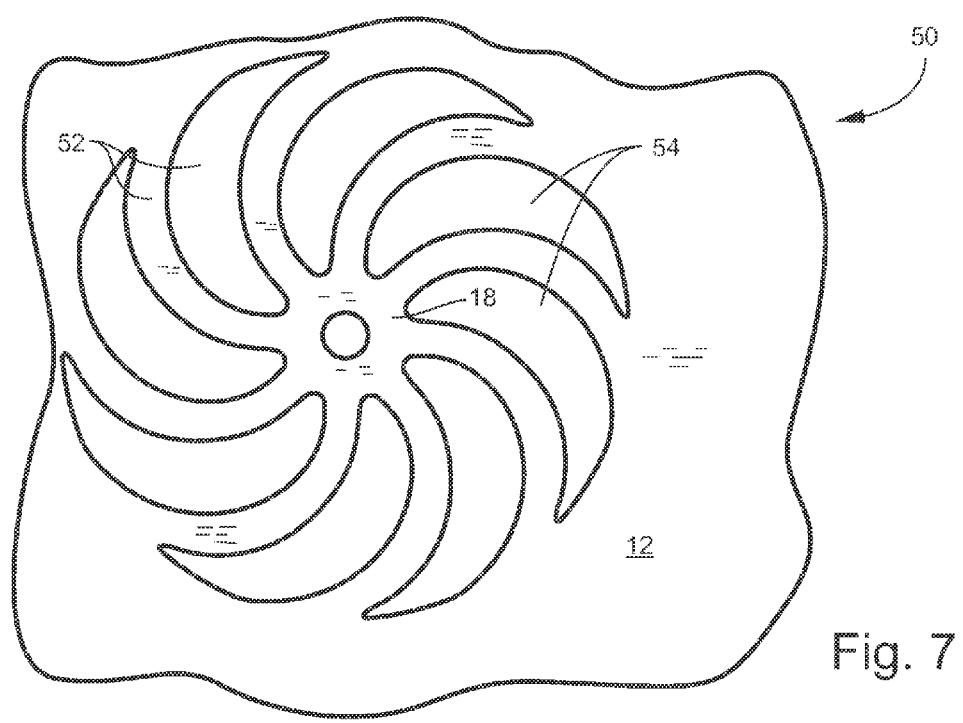
FIG. 7 is a plan view of a multi-axis EA mount comprising a spiral arrangement of a plurality of deformable links with approximately 90 degrees of curvature each.
Figure 8:
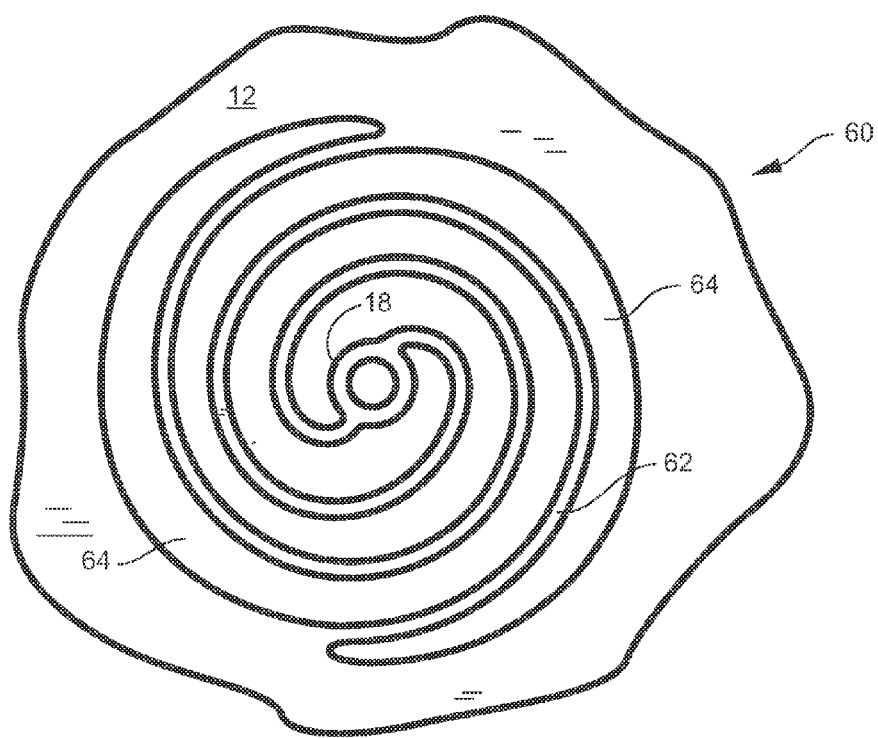
FIG. 8 is a plan view of a multi-axis EA mount comprising a spiral arrangement of two deformable links with approximately 540 degrees of curvature each.

FIGS. 7 and 8 depict additional embodiments of a three dimensionally deformable EA mount formed in a solid plate 12, in which arrays of arcuate deformable links extend from a central mounting boss 18 in spiral patterns. In the embodiment of FIG. 7, a multi axis EA mount 50 comprises an array of eight, evenly spaced, arcuate deformable links 52 between cutout portions 54. Each link 52 curves approximately 90 degrees over its span from the mounting boss 18 to the plate 12. The curvature of the links 52 affords a degree of in-plane and out-of-plane deformability. In FIG. 8, another spiral type multi axis EA mount 60 comprises two arcuate deformable links 62 between cutout portions 64, with each link 62 curving approximately 540 degrees over its length. It will be appreciated that the number of deformable links and the amount of curvature of the links in a spiral type embodiment is a matter of design choice depending on factors such as the available space for deformation, and the size of anticipated shock loads. For example, compared to the design of FIG. 7, a design such as that of FIG. 8 may provide for a longer stroking distance before reaching a failure point of the material, particularly in out-of-plane directions. On the other hand, a design with less curvature such as that of FIG. 7 may be beneficial where higher loads must be absorbed in a relatively small space.

Although depicted in the foregoing drawing figures as an integral portion of a larger solid plate 12, the multi-axis EA mount may alternatively comprise a separate, independent structure adapted for attachment to a larger plate or other object. For example, in one exemplary embodiment illustrated in FIG. 9, a multi-axis EA mount 70 comprises a perforated plate with fastening lugs 78 disposed at spaced intervals about the periphery. The EA mount 70 may be secured in the fashion of a flange to a support by means of the peripheral fastening lugs 78 receiving bolts there-through, and to another object such as a vehicle element (not shown) to be mounted or fastened to the EA mount by means of a central mounting boss 18. It should be appreciated that such an attachment scheme may be employed in conjunction with any of the earlier described embodiments of the multi-axis EA mount.

Figure 9:
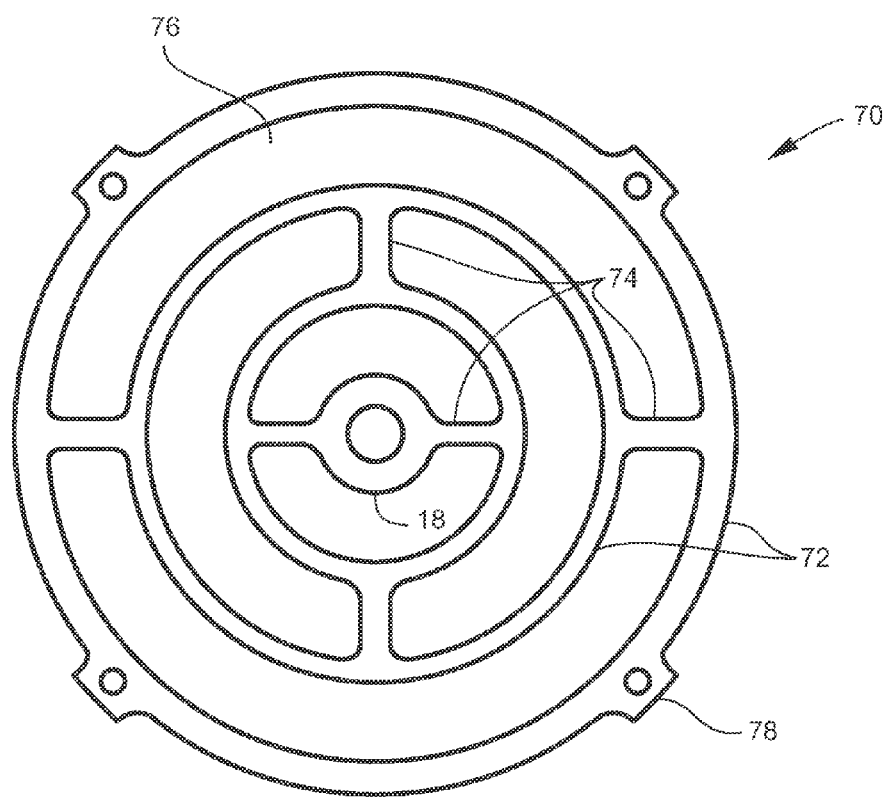
FIG. 9 is a plan view of a multi-axis EA mount comprising perimeter attachment lugs, and arcuate perforations defining a deformable structure of concentric rings and radial bridges.

Continuing with the particular embodiment of FIG. 9, the EA mount 70 comprises an array of arcuate slots 76 formed through the EA mount 70 about the central mounting boss 18 that define a series of concentric rings 72. The arcuate slots 76 constitute concentric series or groups of slots, each concentric group having the same number of slots. In addition, the slots 76 of each series are gradually longer from the center outwards and angularly shifted from one series to another. For example, in the embodiment illustrated in FIG. 9 the slots are shifted by 90 degrees from one series to another. By virtue of this shifted arrangement, EA mount 70 comprises bridges 74 located between the slots of a same series that connect adjacent rings 72. Of course, the nature of the material of EA mount 70, its thickness, the number of slots 76 per series, the length and width of these slots, and the number and relative spacing of the series of slots may be calculated as a function of the amount of mechanical energy which the device is expected to absorb in operation.

Figure 10:
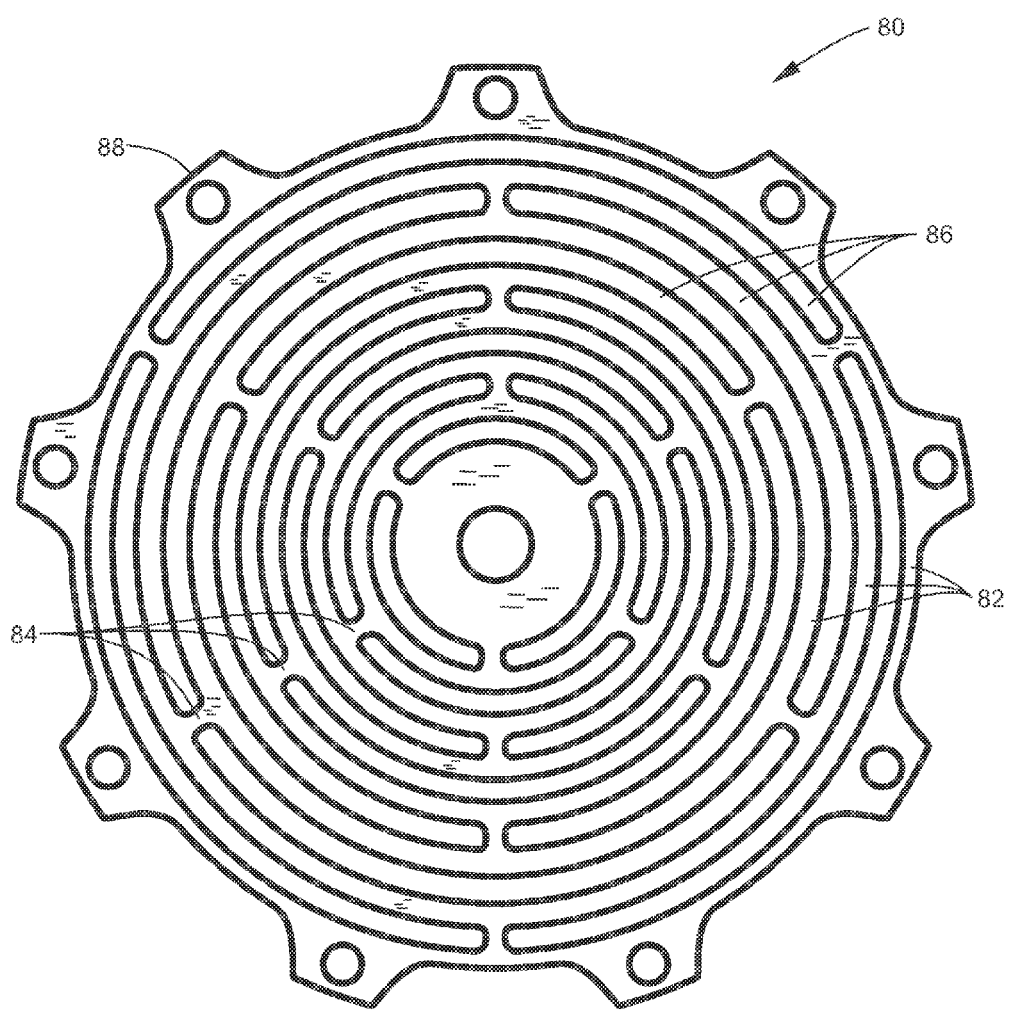
FIG. 10 is a plan view of another multi-axis EA mount like that of FIG. 9, however with a substantially more concentric rings and bridges.
Figure 10A:
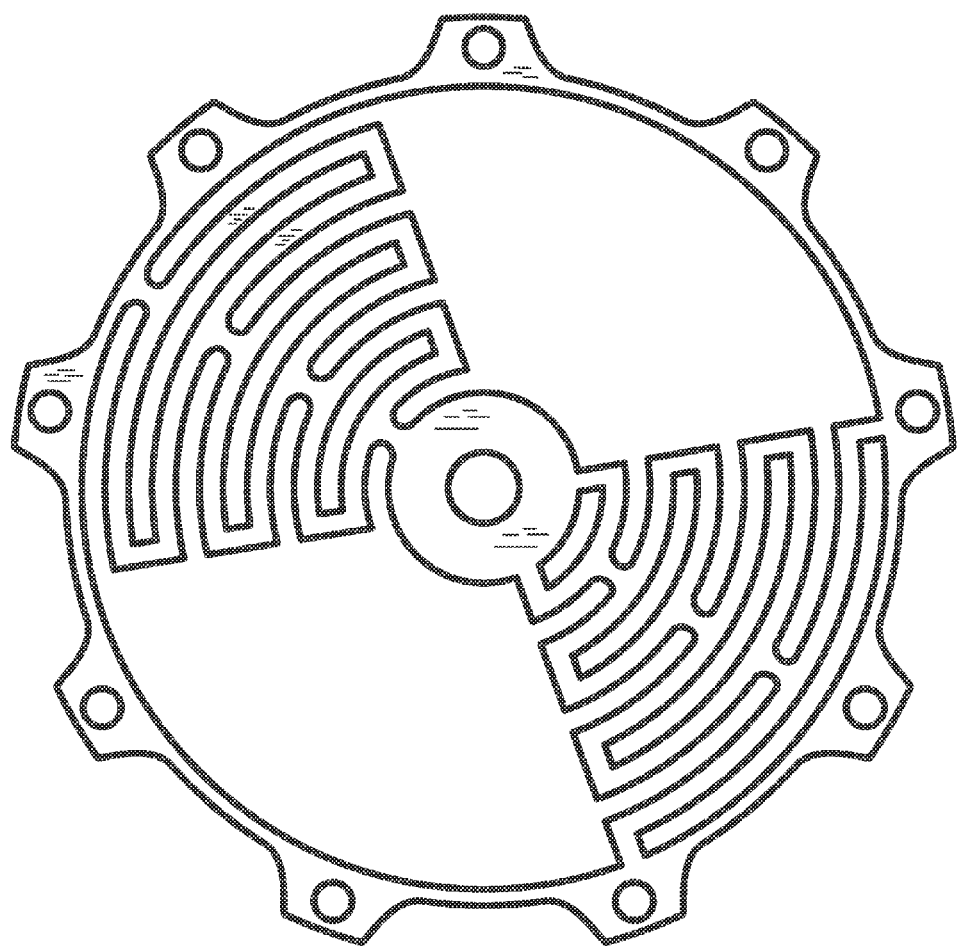
FIG. 10A is a plan view of another multi-axis EA mount like that of FIG. 10 with portions of the structure removed to give a non-axisymmetric shape.

FIG. 10 is another embodiment like that of FIG. 9, again where the perforations comprise concentrically arranged groups of arcuate slots 86 that define concentric circular rings 82 interconnected by radial bridges 84. In this embodiment the length and width of the slots are substantially less than those of an embodiment such as shown in FIG. 9 for links of comparable size, and the quantity of bridges and circular rings is much greater. The multi-axis EA mount 80 of FIG. 10 is also illustrated with peripheral fastening lugs 88, although it could just as well be an integral portion of a larger solid plate instead. FIG. 10A depicts a modified version of the FIG. 10 embodiment wherein portions of the deformable structure have been removed to give the mount a non-axisymmetric shape, similar in that respect to the FIG. 1 embodiment. Such a shape may be preferable for example where the anticipated loads are largely uni-directional. The choice of the FIG. 10 embodiment for modification is purely by way of illustration, and the same type of modification could be made to any axisymmetric embodiment of the EA mount.

Figure 11:
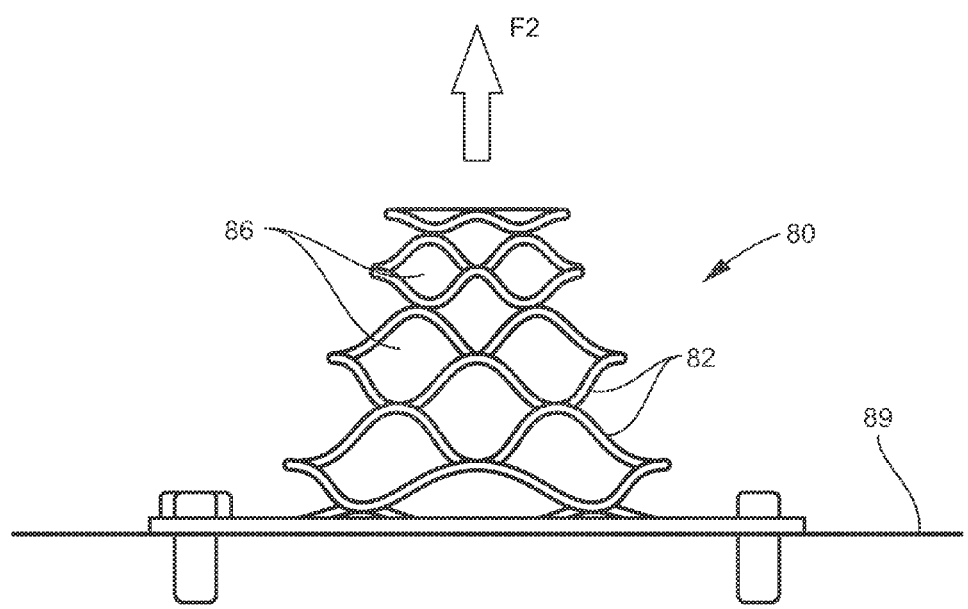
FIG. 11 is a side elevation of the multi-axis EA mount of FIG. 10 shown in a deformed state simulating response to an out of plane shock load.

When subjected to a severe shock load event, a multi-axis EA mount such as the embodiments of FIGS. 9 and 10 is preferably designed to absorb most or all of the energy of the event through plastic deformation. FIG. 11 simulates a plastically deformed condition of EA mount 80 resulting from the application of an out of plane shock load indicated by arrow F2. As can be seen, the arcuate slots 86 have been stretched apart by means of the bridges remaining connected to the originally circular rings 82, giving the deformed link the appearance of expanded metal. Although a purely out of plane loading condition is simulated in FIG. 11, the embodiment of a multi-axis EA mount shown in FIGS. 9 through 11 is inherently effective at attenuating off-axis and in-plane loads of any direction through deformation of the concentric ring and bridge structure.

Figure 12:
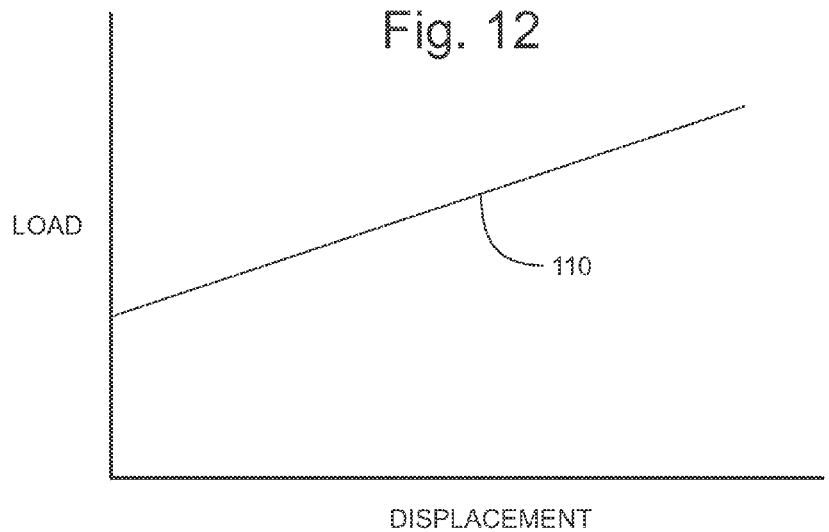
FIG. 12 is a load-displacement plot illustrating the load response of a multi-axis EA mount configured to produce increasing resistance as the mount plastically deforms.

The multi-axis EA mount of the present disclosure may be configured to produce various pre-determined responses to a given shock loading event. For example, it may be desirable to absorb a shock load in such a manner that the resisting force increases as the EA mount strokes. FIG. 12 is a load/displacement plot where curve 110 illustrates the resisting load increasing with stroke distance. Such a non-constant load response may be obtained through a combination of material selection, and preferential shaping of the perforations that define the deformable elements of the mount. In particular, the perforations may be tailored such that the cross sectional area of the deformable elements varies with distance from the central mounting boss. Considering for example an embodiment such as that of FIG. 6, the perforations may be configured such that the kinked portions of the deformable links 42 become progressively thicker with distance from the central boss 18 to produce an increasing load response like curve 110.

The present inventors have recognized that it may also be desirable in certain applications to configure the EA mount to absorb a shock load in steps, or phases as the EA mount strokes. Such a need may arise in applications where objects of substantially different weights must be protected using the same mount. In such cases, a mount designed to protect a relatively light object may fully deform long before the maximum shock load is absorbed when supporting a heavier object. Conversely, a mount designed to protect a relatively heavy object may only partially deform, and thus not fully attenuate a shock load imparted to a lighter object. Accordingly, the multi-axis EA mount may be configured to fully absorb the shock energy associated with a relatively light object in a first deformation phase, and fully absorb the shock energy associated with a heavier object by continuing the deformation process in a second deformation phase.

Figure 13:
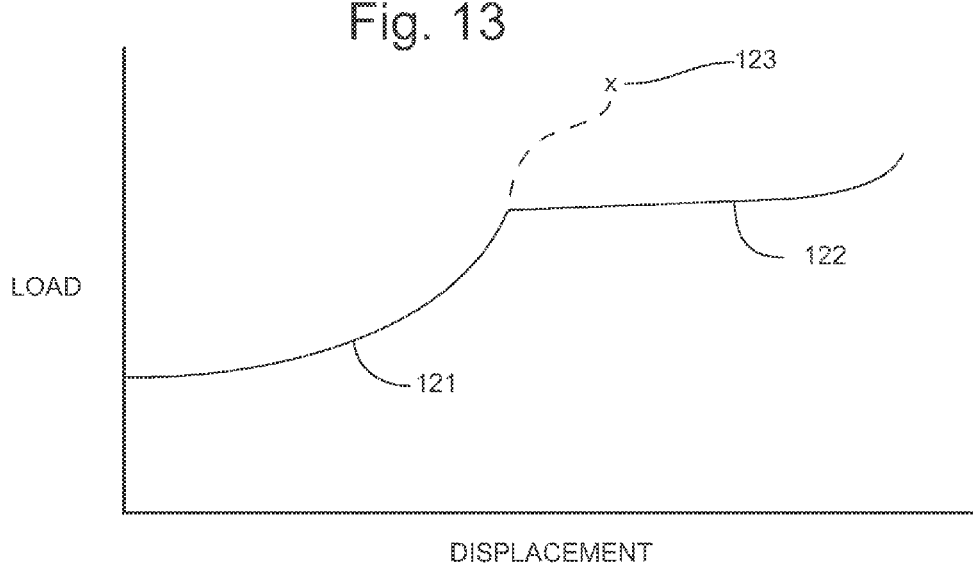
FIG. 13 is a load displacement plot illustrating the load response of a multi-axis EA mount configured to produce a two-phase response to an applied shock load.

FIG. 13 illustrates the above described load/deformation relationship in graphical form, with curve 121 representing the first deformation phase, and curve 122 representing the second deformation phase. The two deformation phases are made possible by configuring the EA mount with first and second deformation regions designed such that the first deformation region can plastically deform before the second deformation region.

When an object supported by a two-phase embodiment of the multi-axis EA mount is subjected to a shock load, the resisting load increases, as indicated by curve 121, while the first deformation region absorbs the shock load. If the object being supported is light enough, the entire energy of the imparted load may be absorbed by the first deformation region without any permanent deformation of the second deformation region. However, if the object sufficiently heavy, deformation of the second deformation region will commence at a point when the load becomes high enough, but before reaching the ultimate strength (noted at ref. numeral 123) of the material comprising the first deformation region. In FIG. 13 the intersection of curves 121 and 122 represents that point. Deformation will thus continue along a load path such as curve 122 for the heavier object until the remainder of the imparted energy is absorbed.

Various design techniques may be employed to create first and second deformation regions of a two, or multi-phase EA mount exhibiting the above described properties. For example, the geometry of the deformation elements may be varied to provide an inner portion of the EA mount with relatively thin deformation elements surrounded by one or more outer regions with progressively thicker deformation elements. Alternatively, various discrete deformation regions may be obtained by variation of material properties with radial distance from the central mounting boss. For example, the heat treat of the metal comprising the EA mount may be varied to produce a very ductile inner region surrounded by progressively less ductile regions. Those skilled in the art will appreciate that other design techniques for achieving the type of mount behavior illustrated in FIG. 13 are possible and certainly foreseeable in view the present disclosure.

Figure 14:
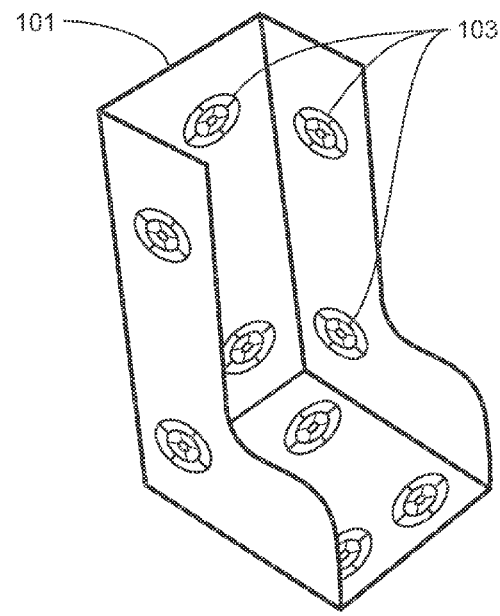
FIG. 14 is a perspective view of a seat frame with integrated multi-axis EA mounts located in the bottom, sides, and back of the frame.

The multi-axis EA mount of the present disclosure may be utilized in various applications and integration schemes. In one exemplary type of application, an EA mount forms an integral portion of a surface or panel of an object that may be exposed to a shock load. FIG. 14 depicts one such application wherein a seat frame 101 made of plate stock incorporates multi-axis EA mounts 103 at multiple locations on the back, sides, and bottom of the frame. The seat frame may for example be of a type intended for use in a military vehicle or aircraft, and thus potentially exposed to shock loads associated with collisions, under vehicle mine blasts, or aircraft slam down. In the simplest case the EA mounts 103 are integral with the seat frame as illustrated in FIG. 14, and formed by simply creating perforations in the plate material comprising the frame. Alternatively, each EA mount 103 may be a separate component with perimeter attachment lugs, or an integrally formed portion of a plate or flange that is then connected to, or part of a seat frame. In such embodiments the seat frame is not limited to plate material, and may include for example box tube or other known structures.

Figure 15:
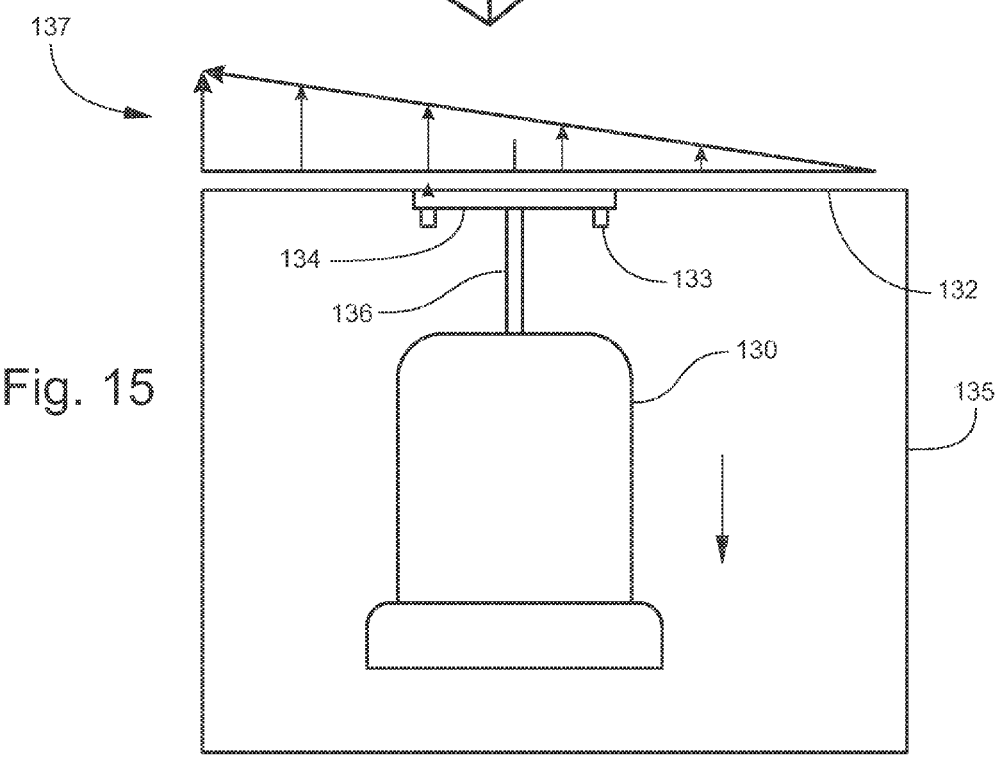
FIG. 15 is a front elevation of a seat suspended from the center of a multi-axis EA mount that is attached to the ceiling of a vehicle compartment.

FIG. 15 illustrates another integration scheme wherein an object is suspended from an overhead support surface using a multi-axis EA mount. In the illustrated embodiment, the object is a seat 130, and the overhead support surface represents a ceiling 132 of a compartment 135 in a vehicle or aircraft. The perimeter of the EA mount 134 is attached to the ceiling 132 via fasteners 133; and a post 136 extending from the seat 130 is attached to the central mounting boss of the EA mount 134. Thus for example, in the event of an externally imparted shock load tending to drive the vehicle and ceiling 132 upward, the inertia of the seat 130 causes a downward load on the central mounting boss of the EA link 134. For a sufficiently high load, the seat and post will move downward as the EA link stretches and plastically deforms, absorbing the energy of the imparted shock load.

The illustrated integration scheme of FIG. 15 is also capable of reacting to off-axis loads, such as may occur for example through application of a nonsymmetrical, or off center externally applied load. A nonsymmetrical load is indicated graphically in FIG. 15 at reference numeral 137. Such external loads can tend to accelerate the vehicle at an angle instead of vertically, typical for example of under vehicle mine blast events and helicopter crashes. The multi-axis EA mount of the present disclosure effectively absorbs the shock load of such events by deforming in the direction of the applied force as the supporting compartment 135 moves at an angle to the seat 130.

Figure 16:
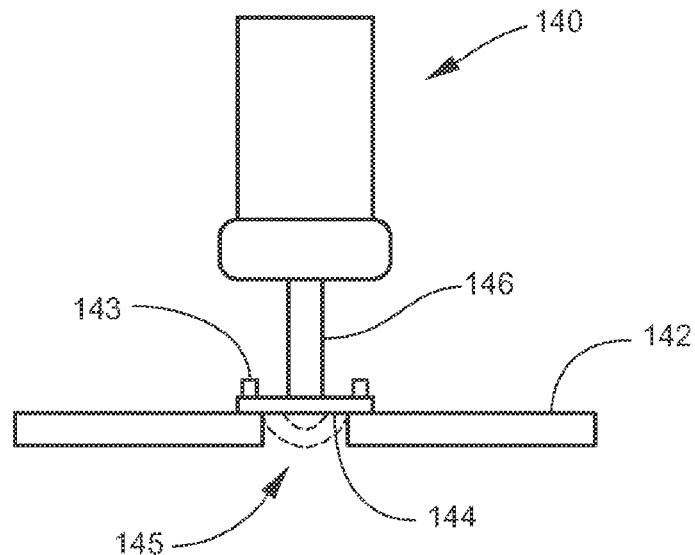
FIG. 16 illustrates a multi-axis EA mount positioned above a hole in a floor, with a seat mounted to the center of the EA mount.

FIG. 16 illustrates yet another integration scheme wherein an object is supported above a supporting surface using a multi-axis EA mount. In the illustrated embodiment the object is again shown as a seat 140 for convenience, and the supporting surface represents a floor 142 of a vehicle or aircraft. The perimeter of the EA mount 144 is attached to the floor 142 via fasteners 143; and a post 146 extending from the seat 140 is attached to the central mounting boss of the EA mount 144. A cutout 145 in the floor 142 provides space for the EA link 144 to deflect downward. Thus for example, in the event of an externally imparted shock load tending to drive the floor 142 upward, the downward inertia load from seat 140 is transmitted to the central mounting boss of the EA link 134 via support post 146. For a sufficiently high load, the seat and post will move downward as the EA link stretches and plastically deforms into cutout 145 as indicated by the dashed lines. Like the embodiment of FIG. 15, the present embodiment effectively reacts to and absorbs the shock force of non-vertical loading events.

Figure 17:
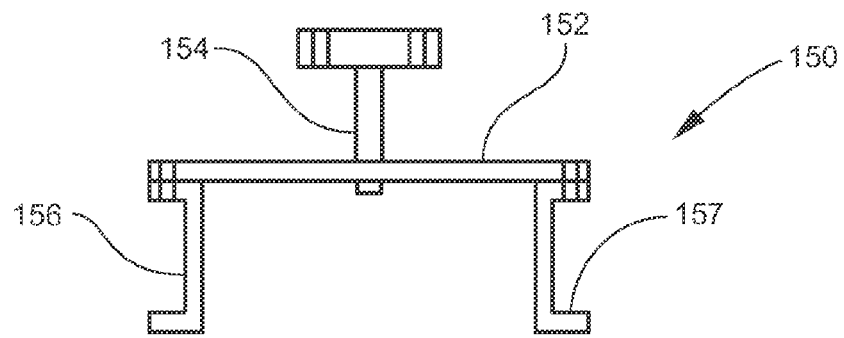
FIG. 17 is a cross-section of an exemplary modular multi-axis EA mounting system that incorporates a spacer structure.

FIG. 17 depicts a modular alternative to the embodiment of FIG. 16 for providing multi-axis EA support to an object from underneath. Illustrated is an exemplary multi-axis EA mount assembly 150 comprising a multi-axis EA mount 152, a flanged post 154 extending from a center portion of the EA mount 152, and a spacer structure 156 extending opposite the post from a perimeter portion of the EA mount 152. The spacer structure 156 is attachable via lugs or a flange 157 to a supporting surface such as the floor of a vehicle. The object to be protected from shock loading, such as a vehicle seat, may be attached to the flanged end of post 154. Alternatively the protected object could be attached to the spacer structure 156, and the post 154 attached to the supporting surface. Under normal, non-extreme loading conditions, the EA mount assembly 150 provides a rigid link between a supporting structure and a protected object. In an extreme load event, the space afforded by the spacer structure 156 affords the multi-axis EA mount 152 room to plastically deform and absorb the load.

Figure 18A:
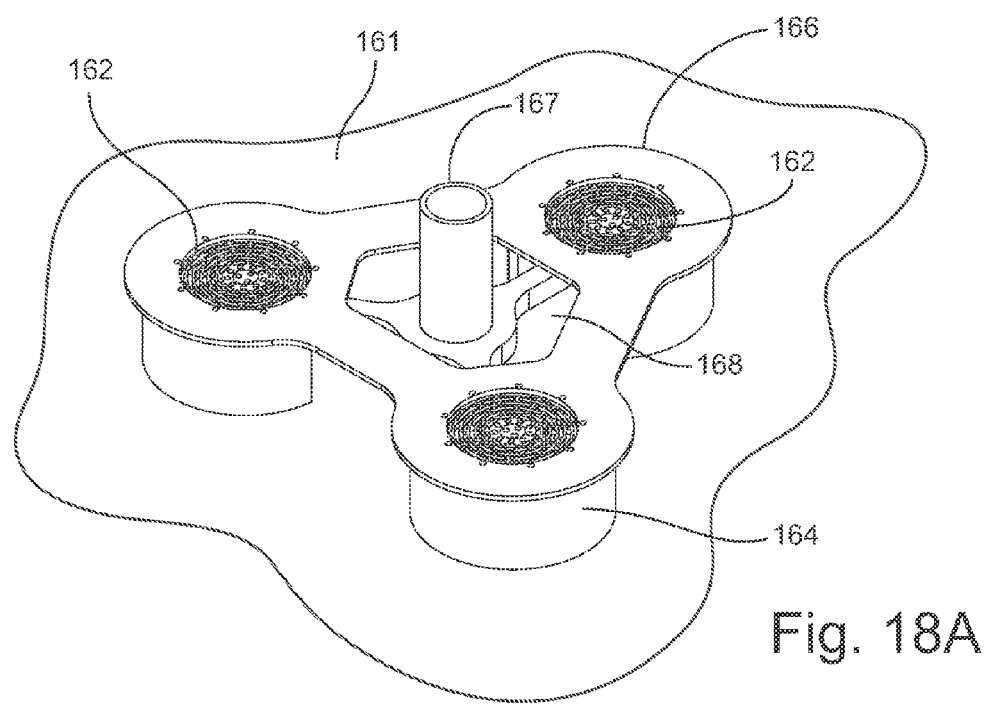
FIGS. 18A and 18B are perspective views of an assembly comprising three multi-axis EA mounts connected to a central support post.
Figure 18B:
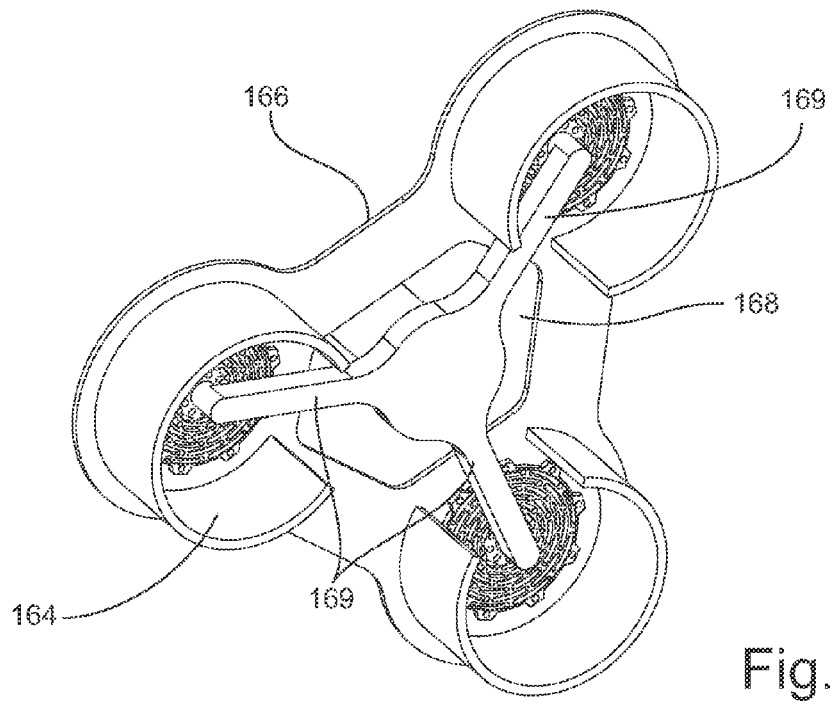

FIGS. 18A and 18B illustrate another integration concept in which three multi-axis EA mounts 162 are used to support a protected object from a mounting surface such as the floor of a vehicle or aircraft. The EA mounts 162 are arranged in a triangular pattern about a mounting plate 166. Cylindrically shaped flanges 164 extending from the mounting plate 166 maintain the plate 166 and EA mounts 162 in spaced relation from the mounting surface 161. An object to be protected, such as a seat for example, is supported at an upper end of post 167, with the lower end of post 167 extending through a central opening 168 in mounting plate 166. Three legs 169 extend radially outward from the lower end of post 167 through openings in cylindrically shaped flanges 164, and connect to the center of each of EA mounts 162 on the side facing supporting surface 161.

In the event of an externally imparted shock load tending to drive the supporting surface 161 upward, the downward inertia load from the supported object is transmitted to each of the EA mounts 162 via post 167 and legs 169. For a sufficiently high load, the supported object and post will move downward as the EA mounts deforms into the space provided by flanges 164. Like the previous embodiments, the present integration concept is capable of reacting to, and absorbing the shock force of nonsymmetrical and off-axis loading events.

For additional design flexibility, two or more multi-axis EA mounts may be combined in various stacking arrangements. FIGS. 19A and 19B illustrate a simple arrangement where two EA mounts 170, 171, of the type shown in FIG. 9 are stacked directly one on top of the other. Under a shock load 172, the two plates both simultaneously resist the load and stroke together as plastic deformation occurs. The stacked mounts may be aligned, or offset from one another by an angle 'A' as shown. The offset angle A may be varied as a means of tuning the stacked EA mounts to provide the type of load response desired for a particular application. A stacked arrangement such as that of FIG. 19 may be substituted for the single plate shown in any of the earlier disclosed embodiments.

Figure 20:
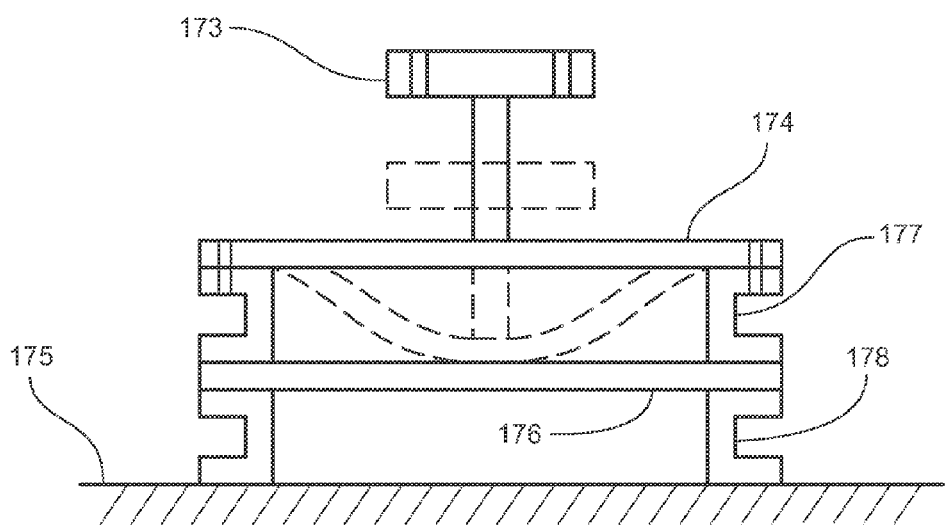
FIG. 20 is a side view of another exemplary stacked embodiment of the multi-axis EA mount comprising two spaced apart plates that are sequentially engaged.
Figure 21:
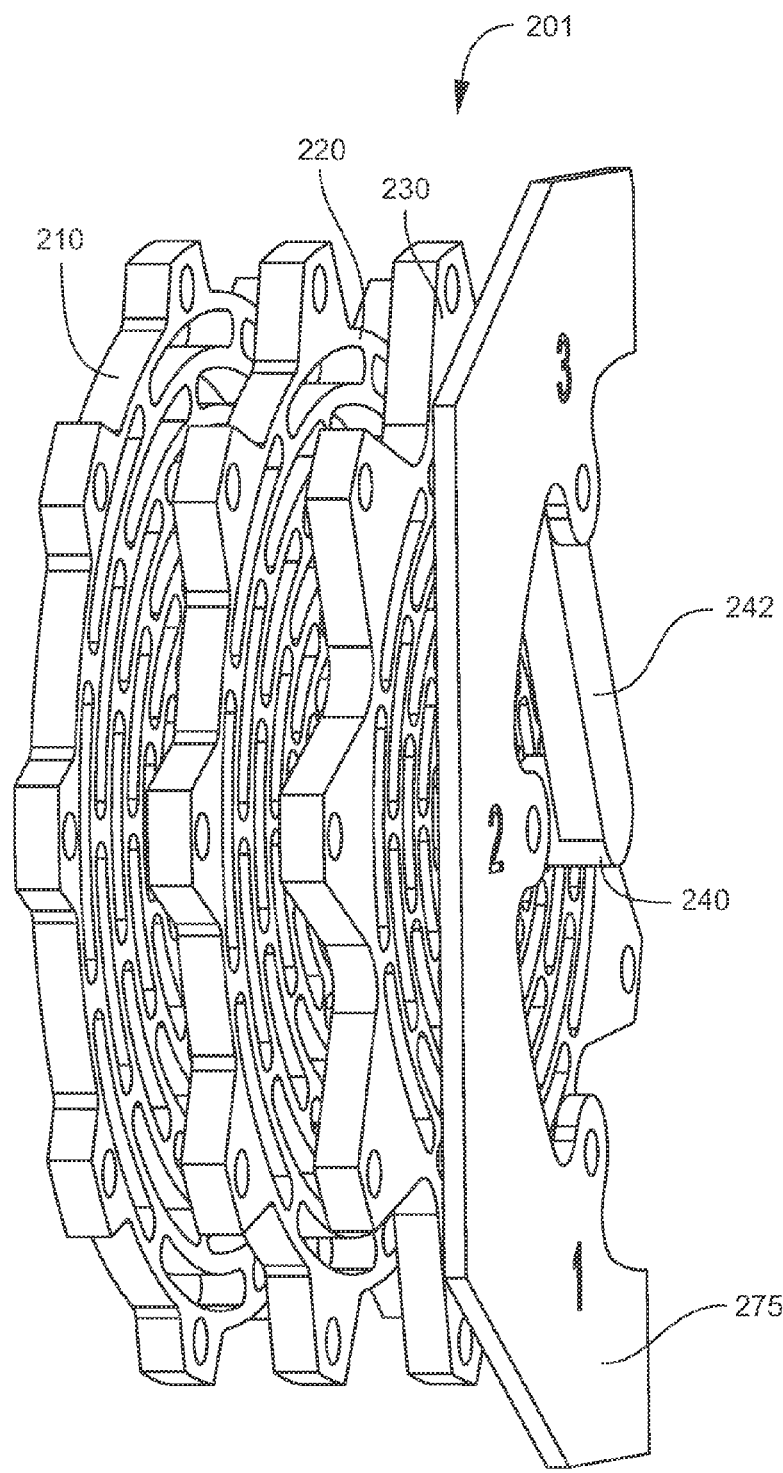
FIG. 21 is a perspective view of a selectively adjustable stacked plate embodiment of the multi-axis EA mount.
Figure 22:
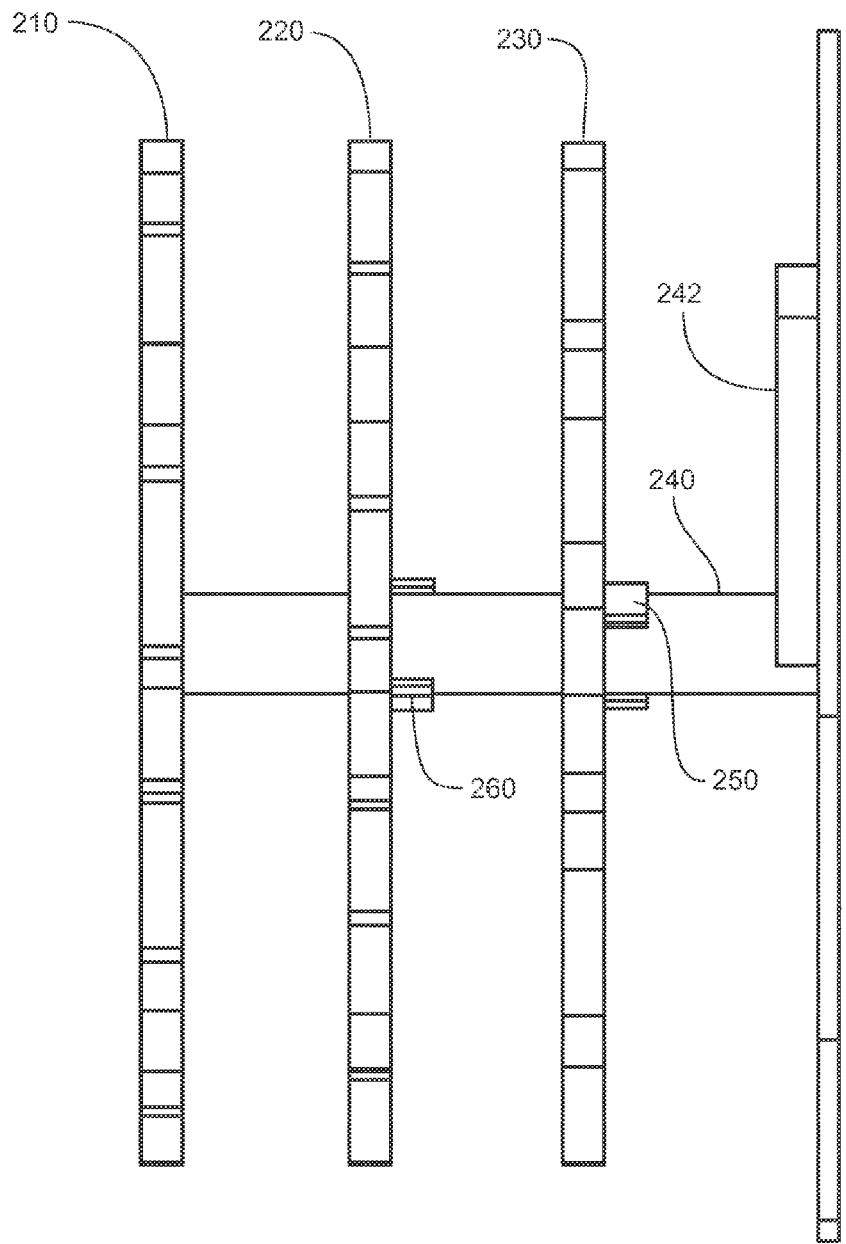
FIG. 22 is a side view of the exemplary EA mount of FIG. 21.
Figure 23:
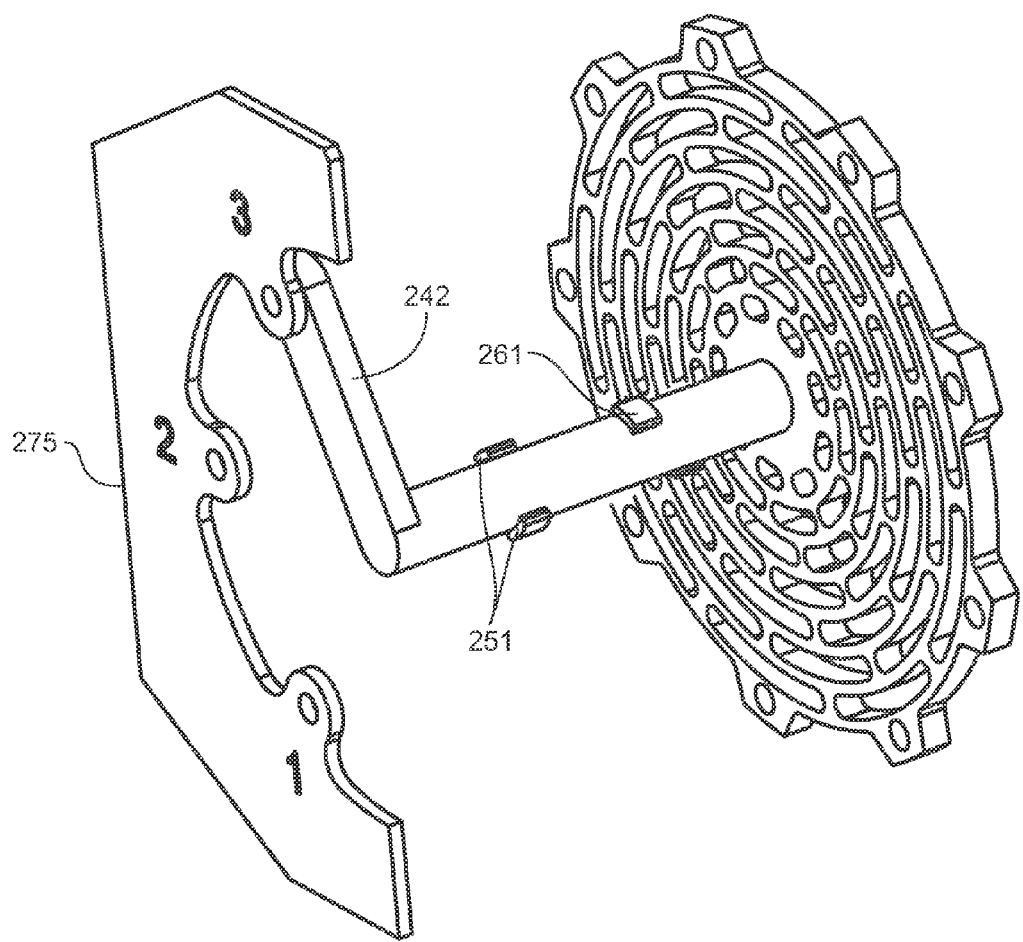
FIG. 23 is another perspective view of the EA mount of FIG. 21 with two of the three EA mount plates not shown.

FIG. 20 illustrates another stacked embodiment, wherein two multi-axis EA mounts 174, 176, are spaced apart from one another and mounted via spacers 177 and 178 to a supporting surface 175. The illustrated embodiment essentially modifies the embodiment of FIG. 17 by inserting a second EA mount in the spacer structure using shortened spacers. Under a sufficient shock load imparted through flanged post 173 to the center of EA mount 174 in the direction of surface 175, EA mount 174 will deform toward EA mount 176 as indicated by the dashed lines. Once EA mount 174 contacts EA mount 176, the resistance force increases, and both EA mounts will deform from that point on in unison until the shock energy has been absorbed. The spacing between the two mounts, the type of EA mount, as well as any of the above described design parameters may be selectively varied to achieve a desired load response. In addition, although a system with two EA mounts is illustrated, more than two EA mounts could be stacked in the same type of arrangement two achieve greater flexibility, and increased stages of energy attenuation.

FIGS. 21-24 depict another embodiment of a stacked EA mount in accordance with the present disclosure. A multi-plate, selectable EA Mount indicated generally at reference numeral 201 comprises EA mount plates 210, 220, 230, an elongated central drive shaft 240, and a plate selector handle 242. Not shown would be a supporting surface or structure rigidly attached to the EA mount plates 210, 220, 230, via the perimeter fastening lugs of each EA mount plate, and a protected article such as a seat attached directly or indirectly to an end of drive shaft 240. The drive shaft 240 is rotatable with respect to the EA mount plates 210, 220, 230, and may be positioned by twisting a control device connected to the shaft such as the selector handle 242. The drive shaft 240 further comprises a first pair of drive lugs 251 associated with EA mount plate 230, and a second pair of drive lugs 261 associated with EA mount plate 220 that are angularly offset from the first pair 251.

Figure 24:
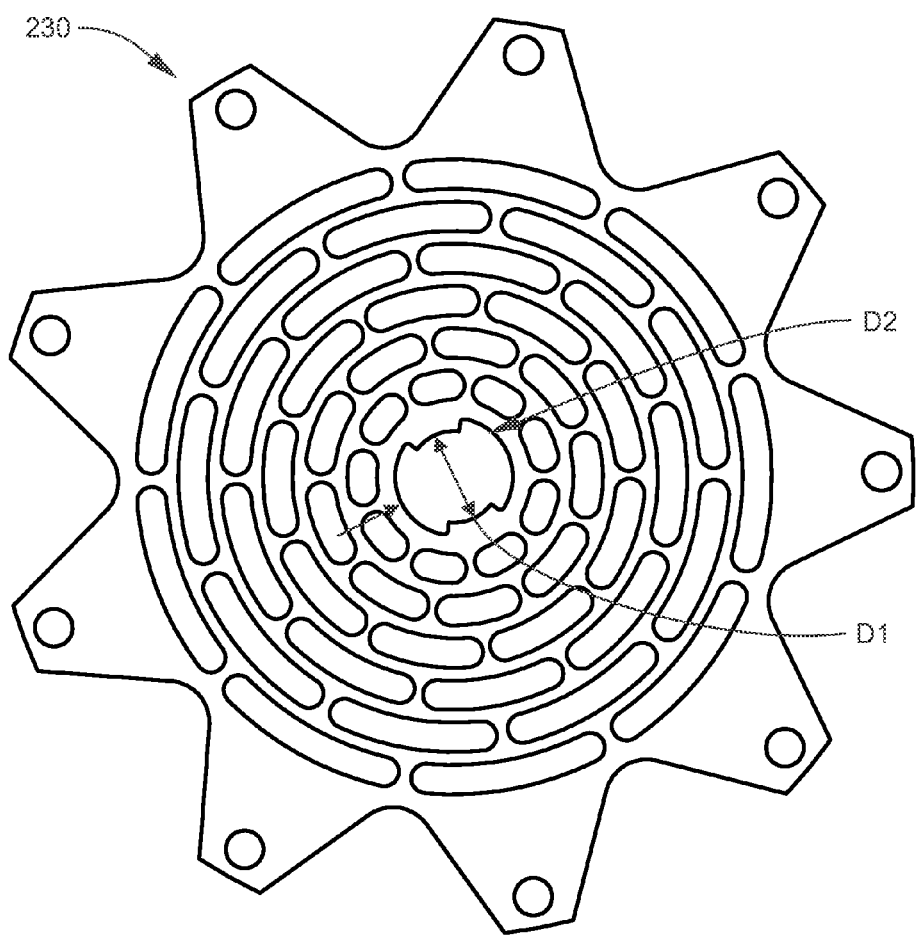
FIG. 24 is a plan view of one of the EA mount plates of the embodiment of FIG. 21.

Plates 220 and 230 both have a central bore for slidably receiving the drive shaft 240. As best seen in FIG. 24, the central bore has a first portion with a first diameter indicated at D1 that is sized to fit the outer diameter of drive shaft 240, and a second portion with a second, larger diameter D2 sized to allow the drive lugs 251 to pass through the gap between the drive shaft and the bore when the lugs are aligned with the second portion of the bore. Conversely when the lugs are not aligned with the second portion of the bore, the drive shaft is axially blocked and unable to pass through.

The EA mount 201 may be configured to utilize one, two, or all three of the EA mount plates during a shock load event. When handle 242 is rotated to the position labeled 1 on the selector plate 275, the drive lugs 251, 261 are positioned to align with the gaps in the bores of plates 220 and 230, and thus free to slide axially relative to those plates. The drive shaft 240 is axially fixed relative to plate 210 however, thus a shock load applied axially through drive shaft 240 with the handle in position 1 will be reacted only by EA mount plate 210. By moving the handle into alignment with the position labeled 2 on selector plate 275, the drive shaft remains free axially relative to EA mount plate 230, however the drive lugs 261 are no longer aligned with the gaps around the drive shaft. Thus an axially applied load through drive shaft 240 is reacted by both plates 210, and 240. Similarly, by moving the selector handle 242 to position 3, all three EA mount plates are simultaneously engaged and resisting the load applied through drive shaft 240.

The EA mount plates may vary in size, for example with plate 210 having the largest area of deformable structure, and plate 230 the smallest as illustrated. Such graduated variation may help to prevent interference between the plates as they deform under load. In addition, the size of the deformation structures, their thickness, material properties, and various other design factors may be selected as appropriate to achieve a desired level of resistance and energy absorption with each handle position. It should also be appreciated that although the selectable EA mount 201 is shown with three plates, more or less than three plates may be used instead with equal effect.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention.

Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A vehicle seat mounting system for attenuating a severe shock load imparted to the seat by the vehicle structure, the mounting system comprising:
   a mounting plate with a perimeter portion connected to one of the seat and the vehicle structure, wherein a space is provided between the mounting plate and a seat occupant supporting surface to allow for deformation of the mounting plate towards the seat occupant supporting surface;
   a central boss connected to the other of the seat and vehicle structure; and
   an array of at least two symmetrically arranged perforations extending through the mounting plate between the perimeter portion and the central boss arranged so as to cooperatively define at least two deformable links that interconnect the central boss with the perimeter portion of the mounting plate, wherein the deformable links are adapted to attenuate the shock load through plastic deformation.

2. The vehicle seat mounting system of claim 1, wherein the deformable links are selected from the group comprising: bars with kinks; bars with bends; curved bars arranged in a spiral pattern; and concentric circular rings linked by bridges.

3. The vehicle seat mounting system of claim 2, wherein the seat comprises a sheet metal frame, and the mounting plate is integrally formed in the sheet metal.

4. The vehicle seat mounting system of claim 3, wherein the sheet metal frame comprises a bottom portion with an integrally formed mounting plate, and a side portion with an integrally formed mounting plate.

5. The vehicle seat mounting system of claim 4, wherein the sheet metal frame further comprises a back portion with an integrally formed mounting plate.

6. The vehicle seat mounting system of claim 1, wherein the deformable links are configured to provide a non-constant resisting force during plastic deformation.

7. The vehicle seat mounting system of claim 5, wherein the non-constant resisting force is obtained by preferentially varying the shape of the deformable links with distance from the central boss.

8. The vehicle seat mounting system of claim 5, wherein the non-constant resisting force is obtained by preferentially varying a mechanical property of the deformable links with distance from the central boss.

9. The vehicle seat mounting system of claim 1, wherein the deformable links are configured to provide a two-phase resisting force during plastic deformation.

10. A vehicle seat mounting system for attenuating shock loads imparted to the seat by the vehicle, the mounting system comprising:
    a mounting plate with a perimeter portion connected to the vehicle structure;
    a central boss connected to a seat frame;
    an array of at least two symmetrically arranged perforations extending through the mounting plate between the perimeter portion and the central boss, the perforations arranged so as to cooperatively define at least two deformable links that interconnect the central boss with the perimeter portion of the mounting plate, wherein the deformable links are adapted to attenuate the shock load through plastic deformation; and
    a first spacer between the perimeter portion of the mounting plate and the vehicle structure, wherein the mounting plate is connected to the spacer, and the spacer is connected to the vehicle structure, the spacer providing clearance for the mounting plate to plastically deform.

11. The vehicle seat mounting system of claim 10, wherein the seat frame includes a support post rigidly connected to the central boss of the mounting plate.

12. The vehicle seat mounting system of claim 10, wherein the mounting system is configured to provide a non-constant resisting force during plastic deformation.

13. The vehicle seat mounting system of claim 10, further comprising a second spacer between the first spacer and the vehicle structure, and a second mounting plate between the first and second spacers.

14. The vehicle seat mounting system of claim 13, wherein the first mounting plate provides a first resisting force, and the second mounting plate provides a second resisting force.

15. The vehicle seat mounting system of claim 13 wherein the mounting system has a first range of motion in which only the first mounting plate is engaged, and a second range of motion in which both the first and second mounting plates are engaged.

16. The vehicle seat mounting system of claim 13, further comprising a selector for engaging one or both of the first and second mounting plates.

\* \* \* \* \*